United States Patent
Mahalal et al.

(10) Patent No.: US 8,321,923 B2
(45) Date of Patent: Nov. 27, 2012

(54) SECURE SHARING OF RESOURCES BETWEEN APPLICATIONS IN INDEPENDENT EXECUTION ENVIRONMENTS IN A RETRIEVABLE TOKEN (E.G. SMART CARD)

(75) Inventors: Ilan Mahalal, Paris (FR); Alain Rhelimi, La Celle-Saint Cloud (FR)

(73) Assignee: Gemalto SA, Meudon (FR)

( * ) Notice: Subject to any disclaimer, the term of this patent is extended or adjusted under 35 U.S.C. 154(b) by 786 days.

(21) Appl. No.: 10/591,496

(22) PCT Filed: Mar. 2, 2005

(86) PCT No.: PCT/IB2005/000559
§ 371 (c)(1),
(2), (4) Date: Sep. 1, 2006

(87) PCT Pub. No.: WO2005/086000
PCT Pub. Date: Sep. 15, 2005

(65) Prior Publication Data
US 2007/0180517 A1  Aug. 2, 2007

(30) Foreign Application Priority Data
Mar. 4, 2004  (EP) .................................. 04290597

(51) Int. Cl.
*H04L 29/06* (2006.01)
*H04L 9/32* (2006.01)
*G06Q 20/00* (2012.01)
*G06F 7/04* (2006.01)

(52) U.S. Cl. ............. 726/9; 726/20; 713/159; 713/172; 705/65; 705/66; 705/67; 705/68; 705/69

(58) Field of Classification Search .............. 726/9, 20
See application file for complete search history.

(56) References Cited

U.S. PATENT DOCUMENTS

| | | | | |
|---|---|---|---|---|
| 6,164,549 A | * | 12/2000 | Richards | 235/492 |
| 6,184,651 B1 | * | 2/2001 | Fernandez et al. | 320/108 |
| 6,233,683 B1 | * | 5/2001 | Chan et al. | 713/172 |
| 6,256,690 B1 | * | 7/2001 | Carper | 710/301 |
| 6,308,317 B1 | * | 10/2001 | Wilkinson et al. | 717/139 |
| 6,385,729 B1 | * | 5/2002 | DiGiorgio et al. | 726/9 |
| 6,801,956 B2 | * | 10/2004 | Feuser et al. | 710/14 |
| 6,824,064 B2 | * | 11/2004 | Guthery et al. | 235/492 |
| 6,883,715 B1 | * | 4/2005 | Fruhauf et al. | 235/492 |
| 7,228,532 B1 | * | 6/2007 | Shaylor et al. | 717/147 |
| 7,413,129 B2 | * | 8/2008 | Fruhauf | 235/492 |

(Continued)

FOREIGN PATENT DOCUMENTS
EP  1 190 316 A  3/2002

(Continued)

OTHER PUBLICATIONS

International Search Report and Written Opinion for PCT/IB2005/000559 dated Jun. 3, 2005 (7 pages).

(Continued)

*Primary Examiner* — Nathan Flynn
*Assistant Examiner* — Trang Doan

(57) ABSTRACT

The invention relates to an authentication and/or rights containing retrievable token such as an IC card comprising at least one physical channel of communication to at least one apparatus and at least two logical channels of communication with said at least one apparatus wherein each logical channel of communication is associated with a different execution environment.

21 Claims, 2 Drawing Sheets

U.S. PATENT DOCUMENTS

| | | | |
|---|---|---|---|
| 7,607,175 B2* | 10/2009 | Susser et al. | 726/27 |
| 2001/0025882 A1* | 10/2001 | Coulier | 235/380 |
| 2002/0099952 A1* | 7/2002 | Lambert et al. | 713/200 |
| 2003/0023954 A1* | 1/2003 | Wilkinson et al. | 717/118 |
| 2003/0053483 A1* | 3/2003 | Hosokawa | 370/466 |
| 2003/0093609 A1* | 5/2003 | Drabczuk et al. | 710/315 |
| 2003/0154375 A1* | 8/2003 | Yang | 713/172 |
| 2004/0088562 A1* | 5/2004 | Vassilev et al. | 713/200 |
| 2004/0123152 A1* | 6/2004 | Le Saint | 713/201 |
| 2004/0177215 A1* | 9/2004 | Nagamasa et al. | 711/103 |
| 2004/0211835 A1* | 10/2004 | Tournemille et al. | 235/441 |
| 2005/0008098 A1* | 1/2005 | Iancu et al. | 375/316 |
| 2005/0081065 A1* | 4/2005 | Brickell et al. | 713/202 |
| 2005/0193218 A1* | 9/2005 | Susser et al. | 713/201 |
| 2006/0130128 A1* | 6/2006 | Gorancic et al. | 726/9 |

FOREIGN PATENT DOCUMENTS

| | | |
|---|---|---|
| JP | 11259605 A | 9/1999 |
| JP | 2002073196 A | 3/2002 |
| JP | 200330596 A | 1/2003 |
| JP | 2003036425 A | 2/2003 |
| JP | 2003123032 A | 4/2003 |
| WO | WO-00/45262 | 8/2000 |

OTHER PUBLICATIONS

English Patent Abstract of JP 2003030596, Publication Date: Jan. 31, 2003 (1 page).

English Patent Abstract of JP 2003036425, Publication Date: Feb. 7, 2003 (1 page).

English Patent Abstract of JP 2003123032, Publication Date: Apr. 25, 2003 (1 page).

English Patent Abstract of JP 2002073196, Publication Date: Mar. 12, 2002 (1 page).

English Patent Abstract of JP 11259605, Publication Date: Sep. 24, 1999 (1 page).

English Translation of Japanese Office Action in Application No. 2007-501379, Dated Mar. 1, 2011(20 pages).

* cited by examiner

SECURE SHARING OF RESOURCES BETWEEN APPLICATIONS IN INDEPENDENT EXECUTION ENVIRONMENTS IN A RETRIEVABLE TOKEN (E.G. SMART CARD)

The invention relates to authentication and/or rights containing tokens such as Integrated Circuit Cards which are introduced in receiving devices which provide services such receiving devices requiring authentication or reading of an amount of rights stored in the token before providing the services.

Such tokens are for example credit cards, SIM cards, prepaid cards or USB authentication tokens which may be either card shaped or stick shaped.

Integrated Circuit Cards (IC cards or 'smart cards') are intrinsically secure computing platforms ideally suited to providing enhanced security and privacy functionality to applications. They are also being used in wireless phones and other communication devices, as a place to store user subscription data, user private keys and other private or confidential data.

They provide a mean for secure storage and computational facilities for sensitive information such as private keys and key fragments, account numbers and stored value, passwords and shared secrets, authorizations and permissions.

At the same time, many of these IC cards and other tokens provide an isolated processing facility capable of using this information without exposing it within the host environment where it is at potential risk from hostile code (viruses, Trojan horses, and so on). This becomes critically important for certain operations such as generation of digital signatures, using private keys, for personal identification, network authentication based on shared secrets, maintenance of electronic representations of value, portable permissions for use in off-line situations.

Current IC cards use the communication protocol defined in the ISO 7816 standard by which an asynchronous protocol is being used and APDU commands carry application level information. This protocol is also being used in mobile phones, and the GSM and 3GPP standards conform to it.

Today there are additional and more rapid synchronous communication protocols that are being integrated in new IC cards. This allows the addition of a synchronous communication protocol (e.g. USB or other), in parallel to the ISO 7816 communication protocol. Since each communication channel uses a different set of pin contacts there are no interdependencies between the two protocols.

Today a terminal hosting the IC card such as a wireless handset or any other communication device uses the IC card services by sending specific commands (called APDU commands) that invoke different computation services or cause the retrieval of data. The service or retrieval of data is performed by an IC card application which performs the request and returns the needed data.

New cards integrate an additional and independent communication protocol (e.g. USB) on a different set of pin contacts of the card. In this case the card manages the two communication channels by two independent processes.

The purpose of the invention is to allow a retrievable token to have enhanced communication with an associated apparatus, i.e. to allow smarter communication with the outside world.

Another purpose of the invention is to allow more efficient use of the resources of he retrievable token.

To this end it is proposed according to the invention a retrievable token as recited in the appended claims.

Other features and advantages of the present invention will become apparent from the following description which will be taken in conjunction with the accompanying drawings.

Figure 1:
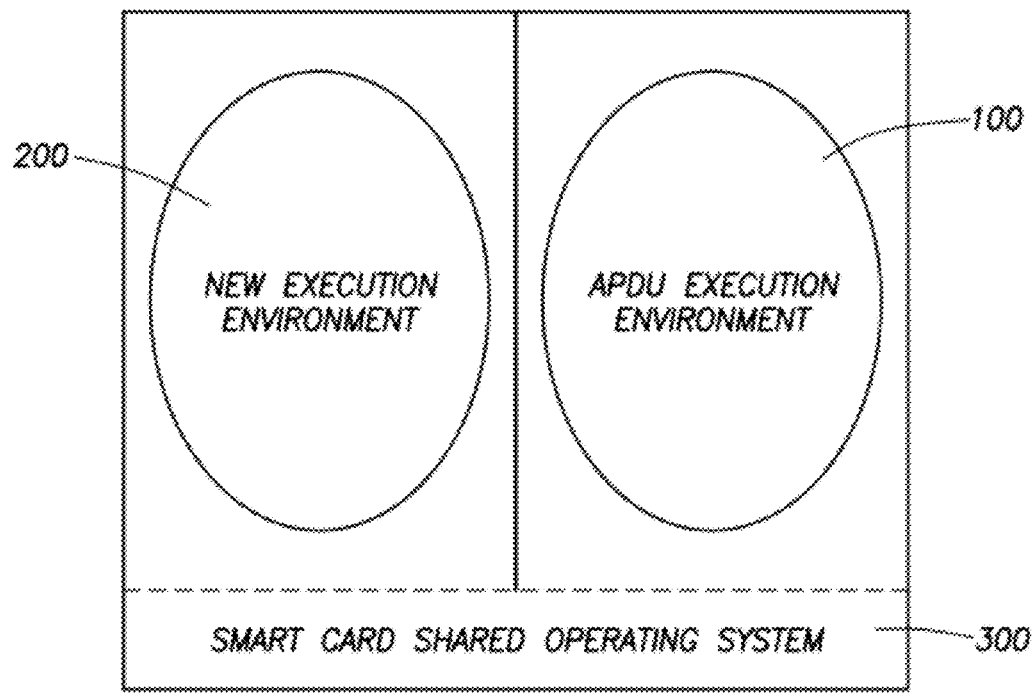
FIG. 1 illustrates schematically an environments arrangement in an IC card according to the invention.

As illustrated on FIG. 1, an IC card will now be described in reference to two virtual or logical execution environments: an first execution environment which in the present case is an APDU execution environment 100 and second execution environment which will be hereafter called "new execution environment" 200.

More generally, the retrievable token can be a smart card or any secure retrievable token able to host at least one physical channel of communication and wherein at least one logical channel of communication can be opened.

According to common meaning, an execution environment will be understood as a set of underlying programs and/or parameters which are used at a given moment in the IC card for running a given application.

Such execution environment can include an operating system or not. For example an execution environment can mainly consist in a set of parameters applied to a given operating system, which set of parameters will differ from an execution environment to the other.

However an execution is not limited in specifying a given operating system.

An execution environment can also be specific due to the fact that it comprises a set of specific programs which lie above an otherwise common operating system.

The "APDU execution environment" 100 is the existing (legacy) execution environment to which all existing standards apply. For example, for the SIM card, it concerns all the standards that define the applications and services that the card implements for network authentication, SIM-Toolkit applications etc.

The "New execution environment" 200 is independent of the old one ("APDU execution environment") and does not have any communication with it. This is important in order to assure that current card applications are not being affected.

In the present case both execution environments are secure.

A general backward compatibility need imposes a separation (fire-walling) between applications in the two execution environments 100 and 200.

The "New execution environment" 200 can allow the execution of several applications, as is the case for the "APDU execution environment" 100. An example for an application of the new execution environment 200 is a Web server that may integrate several web applications.

The "New execution environment" 200 can implement a new set of applications that are independent of the legacy applications in the "APDU execution environment". However, the card issuer may want to allow a certain level of sharing of data and operating system services that will not interfere with the behavior of the legacy environment ("APDU execution environment").

In a preferred embodiment, the applications running under the different environments 100 and 200 exchange data in a secure manner.

A communication protocol between applications in the two execution environments may also be implemented in order to allow a secure sharing of data or functions.

More generally, the shared resource carries data which may be used by at least one of the said two applications which data are protected against access by an unauthorized entity.

This principle can be extended to more than two protocol stacks. Even if the retrievable token has only: two physical layers, these last ones can be shared between several protocol stacks.

In a particular case, a physical layer can provide a support for several logical channels (or "pipes"). So, to illustrate this concept, the USB protocol is able to support several logical pipes (end points) on the same physical medium. Some logical pipes can be dedicated to a protocol stack and some others to another one. The concept is named "composite device" within the USB environment.

A logical or virtual channel appears to the user as a particular data channel although it may be implemented on the basis of physical means which are highly different to this appearing logical channel. The true means which constitute the logical channel are called the physical channel. These true means may be completely different to the appearing logical channel.

Through the same USB connector, the host can manage several types of device (e.g. mouse, keyboard). The present IC card hosts at least two logical channels of communication independently of the number of physical channels of communication.

The concept applied to an IC card able to host an USB interface can take advantage of the invention. Through this USB layer, we can imagine host at the card level of a TCP/IP stack and of a mass storage stack for example.

Beside this USB communication, the smart card uses the regular ISO 7816 protocol to establish another link of communication. This example shows that at least three different protocol stacks can run in the same smart card. So, the invention is applicable where in each specific context, an application can establish a secure and controlled bridge between execution environments running different protocol stacks.

Consequently, the invention can be usefully used within smart card running an ISO 7816 protocol but with multiple logical channels or with a Multi Media Card or a dongle (e.g. USB dongle).

The invention is also applied, but not limited to, the following scenarios, which illustrate well the ability to have a combination of independent physical and logical communication channels:

A retrievable token that has one USB communication channels but with several logical channels ("pipes") where APDU commands are sent on one logical channel, to address the legacy applications, and a TCP/IP protocol stack runs on the other logical channel.

A retrievable token that has one or more physical or logical channels, each associated with a different isolated execution environment. The physical communication channels can be, but are not limited to, the following examples:

Multi Media Memory card (MMC) protocol
SPI (Serial Peripheral Interface) protocol
USB protocol
Smart card contactless protocols
ISO 7816 protocol
ISO (FCD) 15693 protocol
ISO 14443 protocol
The communication protocol defined in the TS 102.221 standard A preferably prescribed sharing of data and operating system services between the multiple execution environments may rely on several mechanisms and we consider only one couple in a set of couples:

A pipe between two applications in the two execution environments when one is the data producer and the other is the data consumer A file sharing when one application has read access to a file and the other has a read/write access to the same file (sort of implementation of a pipe when one application is the producer and the other is the consumer)

Figure 2:
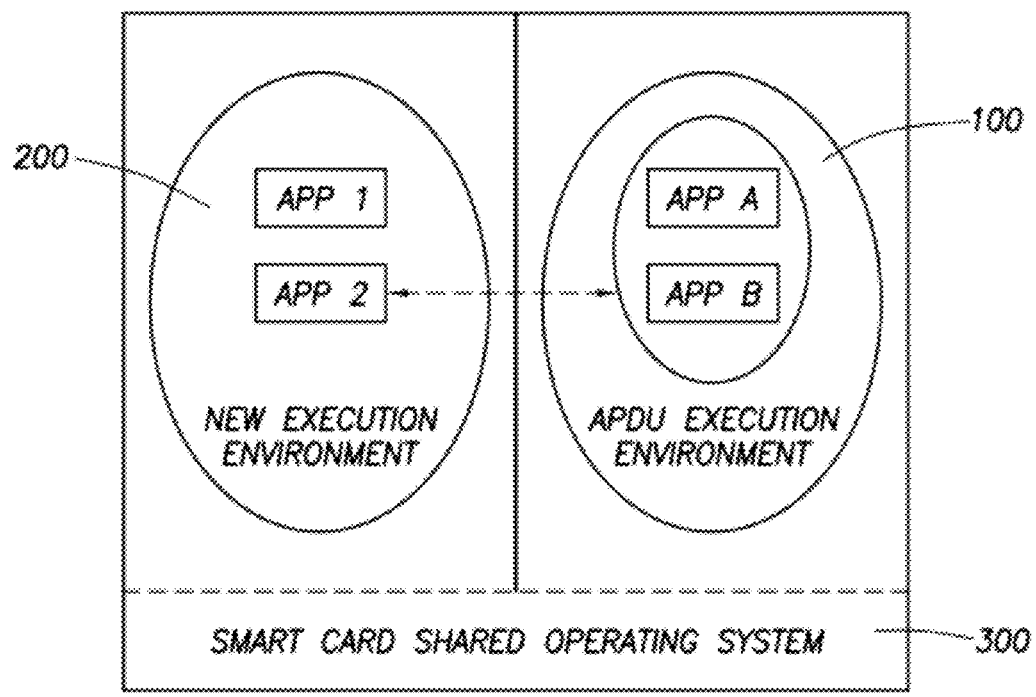
FIG. 2 illustrates schematically an arrangement of files in an IC card according to the invention.

A communication protocol that is defined and implemented internally by the card Operating System and is shared by the two applications Sharing of re-entrant functions and function libraries of the card operating system FIG. 2 will now be described, which illustrates preferred interactions between the two execution environments 100 and 200. In FIG. 2, App2 is an application of the "New execution environment" 200 which can share information and/or services with applications AppA and AppB of the "APDU execution environment" 100.

In a preferred embodiment the IC card runs applications in both environments simultaneously, i.e. for example AppA simultaneously to App2.

The applications AppA, AppB, and App2 are however not necessarily active at the same time. It may be that App A and/or App B were invoked and produced some data that may then be used by App 2 when it starts to run.

The smart card underlining operating system 300 offers the resources and data sharing mechanisms of the following types:

File sharing controlled by Access Control List (ACL)
Stream based communication (data pipe) controlled by Access Control List (ACL)
Proprietary communication mechanisms between applications which satisfy the following characteristics:
These mechanisms enable to send and receive data between two applications running in two different execution environments.
The access to this communication mechanism is controlled by Access Control List (ACL).
Re-entrant functions that are published by shared libraries in the card underlying operating system 300.
Re-entrant functions that are published by an application running in one execution environment to an application running in the other execution environment (e.g. RPC like)

Access Control List (ACL) is the preferred mean to identify an application or the entity that invoked the application, and attach access rights to it. An ACL can be represented as a pair of the following items:

<id, access conditions>
The id can be one of the following:
Application id in the execution environment
User id for whom the application is performing a task
External entity for whom the application is performing a task (e.g. card administrator or super user)
The access conditions may be, but not limited to one of the following: Read, Write, Execute, or any combination of the preceding actions.

The card operating system may offer shared resources to the two execution environments 100 and 200. An application will have access rights to use the shared resources, if there is an ACL that defines its access rights to it. The shared resources may be a communication mechanism between the two execution environments or be a set of shared functions.

Each application may be granted the rights to use the shared resources if it satisfies the corresponding access conditions (ACL) attached to each resource.

The ACLs are defined by an entity that is called card administrator. Normally, this is the card issuer or "super user". This entity can define and change ACLs in the card for the sharing of resources between the execution environments.

The identity of the "super user" is normally proved by cryptographic means that provide a proof of possession of an administrator key.

Figure 3:
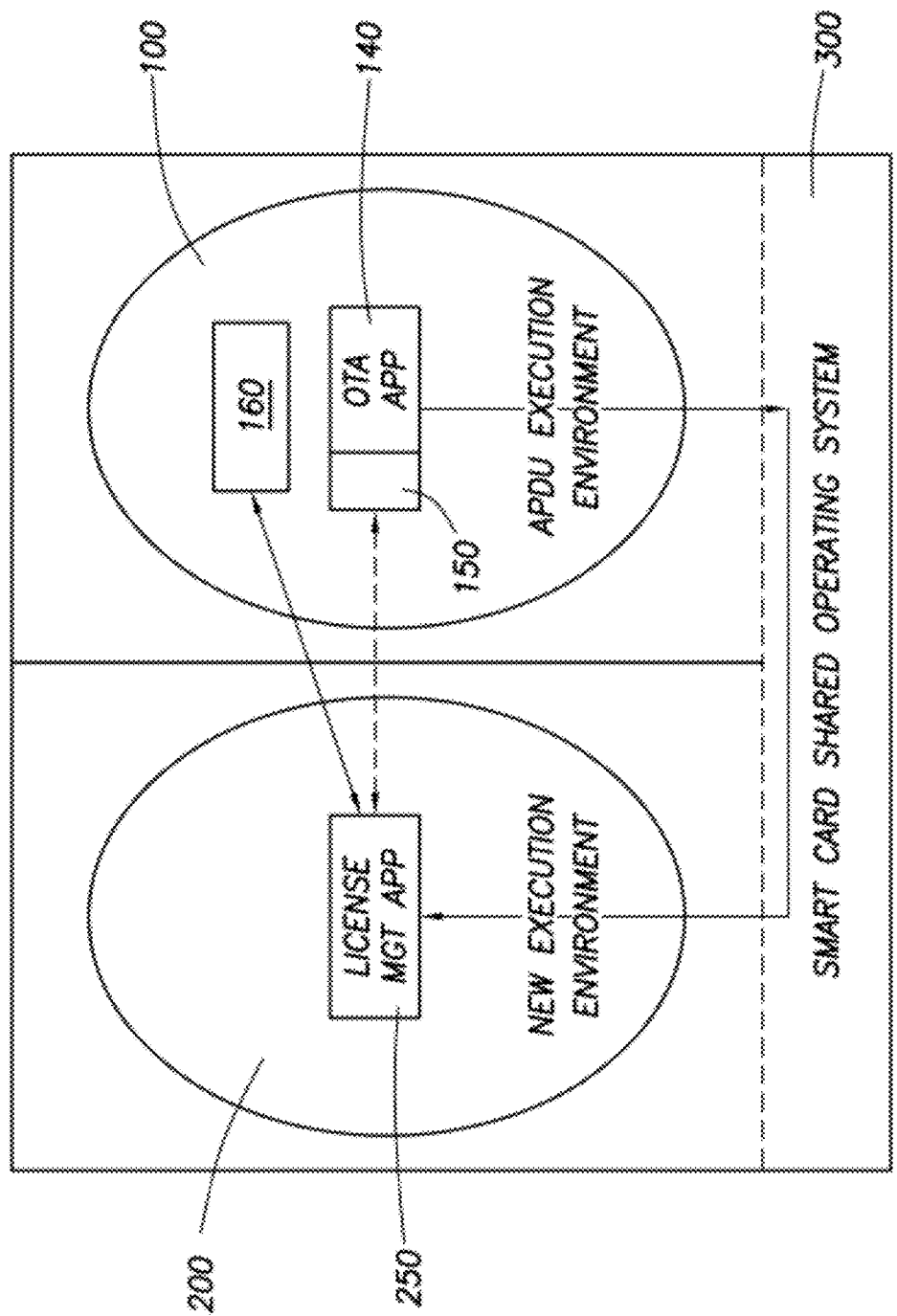
FIG. 3 illustrates an example of cooperation of applications in a particular embodiment of the invention.

Referring now to FIG. 3, let's take the example of a SIM card which also has the additional "New execution environment" 200.

FIG. 3 illustrates the communication mechanisms between GSM standard type and Web type applications such as applications AppA, App B, and App2 previously described. The dotted line indicates that the applications can exchange data between them or share some common resources. The actual communication of the data is done by file sharing or by calling shared libraries that are implemented by the operating system 300 as will be described hereafter.

The IC card implements all the services that are defined in the related GSM standards and they all run in the APDU execution environment 100. The APDU execution environment 100 communicates with the mobile phone via the ISO 7816 and GSM standardized protocols.

The "New execution environment" 200 communicates with the mobile phone via a USB protocol with TCP/IP and HTTP on top, and runs an HTTP web server with an application 250 that can perform the following task:
  Receive information about a content that is installed in the mobile phone,
  Compute the permissions to execute a content that is installed in the mobile phone (a Digital Rights management application).

For this purpose application 250 needs to get the permissions i.e. license information from a license file 150 stored by an application 140 of the GSM standard environment 100. This license file was updated in the card via an OTA message (Over the Air protocol), which is a protocol that is defined in the GSM standards. Application 140 that was running in the APDU execution environment 100 received this message and updated the license file 150 accordingly. The GSM application 140 can update the license file 150 since there is an ACL that gives it a read-write permission to this license file.

In order to get the license information i.e. the permissions to execute the content the Web application 250 in the "New execution environment" 200 reads the shared license file 150 in which the license information is stored. Web application 250 can read the shared license file 150 since there is an ACL for it that gives it a read-only permission to this file. Web application 140 thus gains access to the content that is installed in the mobile phone.

If the Web application 250 tries to also write to this file the operating system 300 will not allow it and will throw an exception.

The Web application 250 that runs in the "New execution environment" 200 also needs to perform a decryption of the content before rendering the decrypted content to the mobile phone for further performing to the benefit of the user.

For that purpose the Web application 250 needs to access a library 160 in the GSM standard execution environment 100 that performs this decryption and that uses a key that was personalized in the card during manufacturing or updated OTA (Over the Air protocol). For that purpose the Web application 250 is entitled to execute a decrypt function which is stored in the decryption library 160 which is shared with the GSM, standard application since there is an ACL that gives it an "execution" permission" to this shared function.

The invention claimed is:

1. A retrievable token comprising:
  one or more physical channels of communication to at least one apparatus;
  a first logical channel of communication to the at least one apparatus, wherein the first logical channel is associated with a physical channel of the one or more physical channels of communication, wherein the first logical channel is associated with a first protocol stack and a first execution environment on the retrievable token; and
  a second logical channel of communication to the at least one apparatus, wherein the second logical channel is associated with the physical channel of the one or more physical channels of communication, wherein the second logical channel is associated with a second protocol stack and a second execution environment on the retrievable token,
  wherein the retrievable token is configured to concurrently execute the first execution environment and the second execution environment, and
  wherein executing the first execution environment comprises executing the first protocol stack and executing the second execution environment comprises executing the second protocol stack.

2. The retrievable token of claim 1, wherein the retrievable token is a Multi Media Memory card.

3. The retrievable token of claim 1, wherein the at least one apparatus is a mobile communication handset.

4. The retrievable token of claim 1, wherein the at least one apparatus is a personal computer.

5. The retrievable token of claim 1, wherein the physical channel of the one or more physical channels of communication is configured to use USB protocol.

6. The retrievable token of claim 1, wherein the physical channel of the one or more physical channels of communication is configured to use SPI protocol.

7. The retrievable token of claim 1, wherein physical channel of the one or more physical channels of communication is configured to use MMC protocol.

8. The retrievable token of claim 1, wherein the physical channel of the one or more physical channels of communication is configured to use a protocol for contactless smart card.

9. The retrievable token of claim 8, wherein the protocol of communication is defined in the ISO (FCD) 15693.

10. The retrievable token of claim 8, wherein the protocol is defined in the ISO 14443.

11. The retrievable token of claim 1, wherein the physical channel of the one or more physical channels of communication is configured to use at least one protocol defined in the TS 102.221 standard.

12. The retrievable token of claim 1, wherein the physical channel of the one or more physical channels of communication is configured to use at least one protocol defined in the ISO 7816 standard.

13. The retrievable token of claim 1, wherein said retrievable token includes at least two independent physical channels.

14. The retrievable token of claim 1, wherein said retrievable token comprises a first application and a second application, wherein the retrievable token is configured to execute the first application in the first execution environment and the second application in the second execution environment, and wherein said retrievable token comprises a resource that is shared between the first application and the second application.

15. The retrievable token of claim 14, wherein the retrievable token comprises an access condition list (ACL) and said resource is shared by the first application and the second application on the basis of said access condition list (ACL).

16. The retrievable token of claim 15, wherein the resource is a shared file, and wherein said access conditions of the access conditions list (ACL) associates respective applications with respective operations on the shared file thereby authorizing said respective applications to perform said respective operations on the shared file.

17. The retrievable token of claim 15, wherein the resource is a shared object on which data is written in a "first in first out" (FIFO) manner and wherein access conditions are defined in the access conditions list (ACL) associating respective applications with respective operations on the shared object thereby authorizing said respective applications to perform said respective operations on the shared object.

18. The retrievable token of claim 15, wherein the retrievable token stores and runs an operating system which is common to the first application and the second application and wherein the resource is a shared function that is implemented by the operating system and for which access conditions are defined in the access conditions list (ACL) which specify respective rights of the applications to invoke said shared function.

19. The retrievable token of claim 14, wherein the first application of the is configured to share a function with the second application by allowing the second application to invoke the function and where access conditions list (ACL) are defined in the retrievable token for the second application to access the shared function.

20. The retrievable token of claim 14, wherein the retrievable token is configured to execute the first application and the second application simultaneously.

21. The retrievable token of claim 14, wherein the retrievable token is configured to implement a communication protocol between the first application and the second application, wherein the communication protocol enables secure sharing of data and/or functions between the first application and the second application.

* * * * *